April 3, 1945. O. J. MORELOCK 2,373,079
APPARATUS FOR TESTING CONDENSERS
Filed Oct. 21, 1940
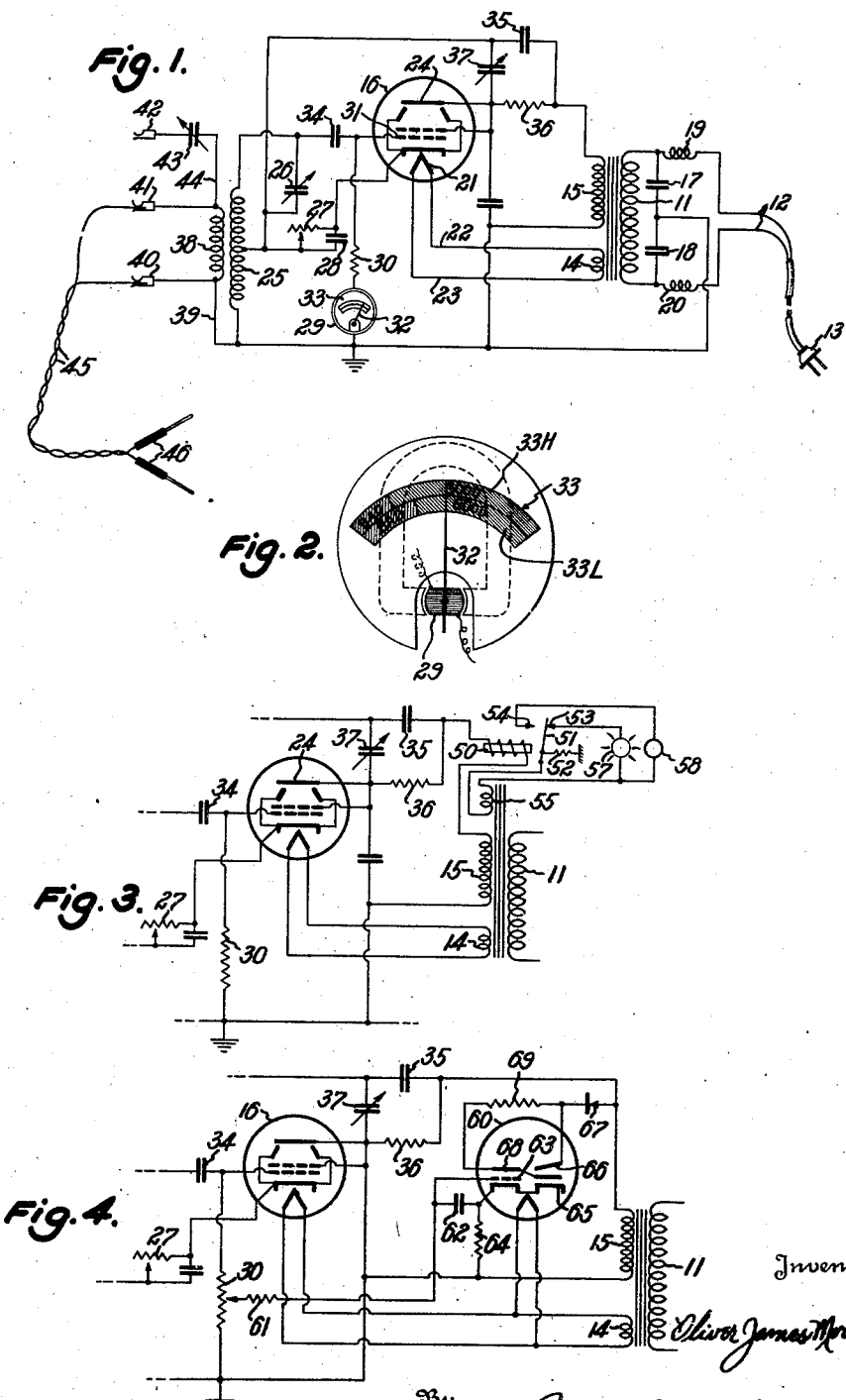

Patented Apr. 3, 1945

2,373,079

UNITED STATES PATENT OFFICE 2,373,079

APPARATUS FOR TESTING CONDENSERS

Oliver James Morelock, Short Hills, N. J., assignor to Weston Electrical Instrument Corporation, Newark, N. J., a corporation of New Jersey Application October 21, 1940, Serial No. 362,152

17 Claims. (Cl. 175—183)

This invention relates to apparatus for testing condensers and more particularly contemplates the provision of a novel electronic circuit for determining the quality of a condenser without removing it from the circuit of which it is a part.

The quantity and variety of electronic devices in use at the present time establishes a pressing need for suitable test equipment with which the technician and service man may quickly and definitely locate faults and defective parts. Condensers of one type or other form an inherent part of practically every electronic circuit and the failure of a condenser often unbalances the circuit characteristics to such extent that the device ceases to function properly. Short circuited condensers are usually not difficult to locate as they produce a major change in the circuit potentials which will be at once noticed by an experienced operator. The short circuited condition of the condenser can be conclusively established by making a quick resistance check with a simple ohmeter. On the other hand, intermittently or partially open circuited condensers cause no change in the static characteristics of the circuit and quite often the rupture between the foil and the external connection tab is so slight that even the insertion of an instrument of high sensitivity into the circuit will cause a minute spark which temporarily heals the condenser. Present condenser testers serve only a limited purpose as their use, in practically every case, requires that the condenser be removed from the circuit. The heat of a soldering iron or the relative movement of parts attending the removal of the condenser from the circuit often reestablishes a good contact between the defective parts so that the condenser will check "good" yet, upon reinsertion into the circuit, it may revert to the defective condition. The behavior of a condenser in this manner occurs frequently, thereby compelling the operator to resort to the substitution method to locate the faulty unit. When applied to a device such as a radio receiver, it is appreciated by those confronted with the task, that this method is laborious and time consuming.

It is, therefore, an object of this invention to provide a condenser tester which makes it possible for the operator to quickly test all the condensers of an electronic circuit and thereby segregate the faulty components from the remainder of the circuit with a minimum expenditure of time.

Another object is the provision of a compact device provided with a ratio frequency oscillator, an indicator and a pair of test leads whereby the testing of a condenser may be accomplished definitely and with a minimum expenditure of time.

A further object is the provision of an electron tube, an associated oscillator circuit, and an out-of-phase grid feedback circuit whereby the tube is normally prevented from oscillating.

A still further object is the provision of an electronic circuit comprising an electron tube, an associated oscillator network, an indicator in a circuit of the tube for indicating the amplitude of the oscillations and an associated network whereby out-of-phase energy is fed back to the grid circuit to normally prevent the tube from oscillating.

A still further object is the provision of an electronic network comprising an electron tube and oscillator circuit, an associated balancing circuit feeding out-of-phase energy to the grid circuit to normally prevent the tube from oscillating, and a coil which, upon being short circuited, reflects the short circuited impedance into the oscillator circuit thereby upsetting the circuit balance and causing the tube to oscillate.

A further object is the provision of a compact condenser tester provided with a normally balanced electronic network having an oscillator coil, an indicating instrument, and a coil coupled to the oscillator coil and provided with a pair of test leads detachably connected to the ends thereof, whereby the quality of a condenser will be indicated by the instrument upon applying the test leads to the terminals thereof.

These and other objects and advantages will be apparent from the following specification when taken with the accompanying drawing. The drawing is for the purpose of illustration and description and is not to be construed as defining the limits of the invention, reference being had for this purpose to the appended claims.

In the drawing:

Fig. 1 is a wiring diagram of the electrical circuit of an embodiment of the invention;

Fig. 2 is a plan view of the scale of the indicating instrument of the testing apparatus; and Figs. 3 and 4 are fragmentary circuit diagrams of condenser testing apparatus that includes other types of indicating systems.

The invention contemplates the use of an oscillator tube energized in the conventional manner. For simplicity of manufacture and use the embodiment, shown in Fig. 1 and hereinafter described, is energized by alternating house current, through a suitable transformer, but the device will function equally as well when energized by a direct current source such as a battery or the output of a rectifier. The transformer comprises a primary winding 11 arranged to receive power from an alternating current source, such as household power, through wires 12 and plug 13, and two secondary windings 14, 15 for energizing tube 16. In order to electrically isolate the apparatus, a conventional filter circuit comprising condensers 17, 18 and radio frequency choke coils 19, 20 is employed across the transformer primary. This filter prevents radio frequency disturbances, normally encountered in common power sources, from interfering with the apparatus and likewise prevents the operation of the apparatus from disturbing other radio equipment fed from the same source. The secondary winding 14 provides voltage for heater 21 of tube 16, which may be a self oscillating triode or beam power tube such as, for example type 25L6, through wires 22, 23. The other secondary winding 15 provides voltage for the plate 24 of the tube.

A conventional LC oscillator circuit is connected to the tube 16 to condition it for oscillation, the circuit including a coil 25, an adjustable condenser 26 across the cathode-grid section of coil 25, and an adjustable resistor 27 between the center tap of coil 25 and the tube cathode. A by-pass condenser 28 is shunted across the resistor 27 which may be adjusted to control the amplitude of the oscillations. A current-responsive indicating device 29 and series grid resistor 30 are connected between the control grid 31 and the plate 24. The device 29 is illustrated in Fig. 1 as a direct current measuring instrument of the type including a permanent magnet and a pivoted coil that displaces a pointer 32 over a scale plate 33. The pointer deflection varies with the direct current flowing in the grid circuit and may be taken as an indication of the quality of a condenser under test, as will be explained more fully hereinafter. One side of instrument 29 is connected to ground to prevent possible superficial potentials from affecting the instrument indication. The grid coupling condenser 34 allows grid rectification and the build-up of a bias voltage across resistor 30 and instrument 29, and prevents coil 25 from short circuiting this voltage.

The tuned oscillator circuit above described, would normally cause the tube to oscillate at a frequency, preferably a high frequency, determined by the characteristics of the circuit. The present invention contemplates the addition of an auxiliary circuit connected to "buck" the normal oscillator circuit and thereby prevent the tube from oscillating. This bucking circuit, comprising fixed condenser 35, resistor 36 and adjustable condenser 37, feeds out-of-phase energy back to the grid circuit in such a manner as to cause the tube to cease oscillating. The value of resistor 36 depends upon the operating plate voltage of the particular vacuum tube and the value of voltage supplied by the secondary winding 15 of the transformer, and the value of resistor 36 in turn determines the values of condensers 35, 37. It will be apparent that the auxiliary circuit may be so adjusted, with respect to the phase relationship of the current in the oscillator tank circuit, that the flow of grid current through the indicating device 29 will be substantially zero. In actual practice, it has been found that the resultant grid current is not actually zero when the tube is not oscillating, but assumes a small value which, however, has no effect upon the operation or use of the apparatus. This minute current flow during conditions when the tube is not oscillating is due to the potential gradiant between the cathode and plate, and is a condition normally found in vacuum tubes.

The invention further contemplates a third circuit, of which the condenser under test forms a part. This testing circuit is coupled to the oscillator circuit in such manner that under proper circumstances the phase relationship between the oscillator and bucking circuit is upset, thereby causing the tube to oscillate. A coupling coil 38 is located in close proximity to oscillator coil 25 and connected thereto on one end by wire 39. In practice this coil is wound on the same form which supports the oscillator coil and in such manner that its position relative to said oscillator coil may be readily adjusted. Pin jack terminals 40, 41 are directly connected to the ends of the coupling coil 38, and a third pin jack terminal 42 is connected to one end of the coil through an adjustable condenser 43 that serves to extend the operating range of the apparatus. The lead 44 to condenser 43 and terminal 42 preferably extends to the end of the coupling coil 38 that is not connected to the oscillator coil through the jumper 39. Two leads 45 have plug type pins at their inner ends for insertion in the pin jack terminals, and the leads terminate in insulated test prods 46 that are to be placed in contact with the terminals of a condenser that is to be tested. The leads may be of a desired length of up to four or five feet, and of any suitable type. Unshielded cables are satisfactory but it is desirable that they be twisted or tied together at suitable intervals, particularly for a length of approximately eighteen inches from the body of the apparatus, as the loop that might otherwise be formed by separated leads may alter the characteristics of the circuit.

The instrument scale 33 is of the double range type with outer and inner arcs 33H, 33L for the high and low ranges, respectively. The scale markings may be of any suitable type and when, as shown, the markings take the form of red and green sections with legends "Bad," and "Good," respectively, the red section may extend over approximately the lower quarter of the scale. The red section indicates the range of pointer displacements for the small flow of grid circuit current when the tube is not oscillating. The increase in grid circuit current that results when a good condenser of a given capacity is shunted across the coupling coil 38 depends upon the design of coil 38 and its location with respect to the oscillator coil 25, and a certain minimum capacity is therefore required in the coupling circuit to effect a displacement of the pointer into the "Good" section of the scale.

The circuits may be designed for any desired testing ranges, and the following data with respect to one embodiment of the invention is given as an indication of values that may be used. The oscillator circuit was designed to produce oscillations of a frequency of about 3 megacycles, and the coupling coil 38 comprised 24 turns of wire adjacent the oscillator coil 25. The coupling between coils 38 and 25 was so adjusted that good condensers having a value of 0.001 mfd. or higher would, when shunted across coil 38, produce a deflection of the instrument pointer in the "Good" section of the upper range scale 33H. With a condenser 43 of approximately 0.00025 mfd., the test range was extended to include condensers having a capacity from 0.001 down to 0.0002 mfd. As shown in Fig. 2, the "Bad" section of the lower range scale 33L extends somewhat beyond the corresponding section of the high range scale 33H due to the inclusion of the condenser 43 in the test circuit.

A condenser checker made in accordance with this invention may be assembled into a compact case to be readily portable. The only elements which need be visible or accessible to the operator are the scale of the indicating instrument 29, the open or contacting ends of pin jacks 40, 41, 42 and a suitable knob for adjusting the value of resistor 27. For convenience, these elements may be located on the top panel of the case. Condensers 26, 37 and 43 need be adjusted only once to balance the circuit properly in the course of manufacture, and they remain in set position thereafter.

To operate the device, the plug 13 is inserted into any 60 cycle supply line and sufficient time is allowed for the elements of the tube to reach proper operating temperature. As explained hereinabove, the tube does not oscillate, hence practically no current flows through the indicating instrument 29 and the pointer does not move beyond the "Bad" sections of the scales. To adjust the apparatus to normal operating condition at the higher range, the operator inserts the leads 45 in the pin jacks 40, 41 and then short circuits the coupling coil 38 by holding together the metal tips of prods 46. Under such conditions the short circuited impedance that is reflected into the oscillator tank circuit, through the mutual coupling of the coils 38 and 25, causes an upset in the phase relationship between the oscillator and bucking circuit. This unbalance causes the tube to oscillate with the result that a substantial current flows in the grid circuit and through the indicating device 29. The operator then adjusts the value of resistor 27 until the amplitude of the oscillations is sufficient to cause the pointer 32 to indicate top mark with respect to scale 33. Separation of prods 46 removes the cause of circuit unbalance so that the tube ceases to oscillate, and the apparatus is in condition for use.

The operator, first having made certain that the voltage has been removed from the device under test, proceeds to make his tests by touching the tips of prods 46 across the terminals of a suspected condenser. If the condenser is of proper quality the coupling coil 38 will be effectively short circuited. This short circuited impedance is reflected back into the oscillator tank circuit and the tube oscillates, thereby developing a grid current flow through the instrument 29 that deflects the pointer to the upper or "Good" section of the scale arc 33H. Conversely, if the condenser is defective, the tube will not oscillate and the indicator pointer will remain in the lower or "Bad" section of the scale arc.

To increase the operating range of the apparatus, the operator shifts the test lead from pin jack 41 to pin jack 42. The introduction of condenser 43 into the coupling coil circuit necessitates a rebalancing of the circuit preparatory to the testing of condensers within this range. This is done in the same manner as was the original adjustment, namely, by short circuiting prods 46 and adjusting resistor 27 until the pointer of the indicating instrument deflects to the top mark of the scale.

Condensers of a capacity less than .0002 mfd. may be tested by adding an additional condenser across the test leads. The capacity of the added condenser should be such that, when added to the capacity of the condenser to be tested, the total additive capacity of the two will fall within the range limits of .0002 to .001 mfd.

Condensers which have an appreciable amount of inherent series resistance or inductance possess a poor power factor and may therefore disturb the circuit characteristics of a device to such extent as to render the particular device unsatisfactory for the intended purpose. Such faulty condensers can be quickly and positively located by means of the apparatus and method herein disclosed. This may be ascertained by the operator to his own satisfaction by connecting a resistor in series with a condenser known to be of good quality and applying the leads of the tester across the two. The indicator pointer will assume a position in the lower quarter, or "Bad" section of the scale.

It will be recognized that the broad invention, herein described, permits a wide latitude in the design of equipment for checking or testing condensers. While I prefer to place the indicating instrument in the grid circuit of the vacuum tube, it may also be inserted into the plate circuit or, in fact, into any other part of the circuit, wherein oscillatory currents may be measured.

Other types of current-responsive devices may be substituted for the measuring instrument 29 in the grid circuit, or the indicating device may be placed in another tube circuit. The latitude in the choice and the location of the current-responsive device is indicated by the Fig. 3 circuit in which a relay is controlled by the flow of plate current and the Fig. 4 circuit in which an electron ray or "magic eye" tube is controlled by the bias voltage developed across the grid bias resistor of the oscillator tube.

In the relay type of indicating system, the relay winding 50 is designed to attract the armature or contact arm 51, against the force of the retracting spring 52, when the plate current flow rises appreciably above its minimum value corresponding to a non-oscillating condition of the tube 16. Contact arm 51 moves between a back contact 53 and an active contact 54 to complete a circuit through a current source 55, preferably a secondary winding on the power supply transformer, and the signal lamps 57 and 58, respectively.

The oscillator and test circuits, not shown in Fig. 3, may be identical with those of Fig 1, and other elements of the Fig. 3 circuit are identified by the corresponding reference numerals but will not be described in detail. The method of adjusting and employing the Fig. 3 circuit will be apparent from the description of the Fig. 1 circuit; a good quality condenser being indicated by the lighting of the signal lamp 58.

The testing apparatus of Fig. 4 is similar to that of Fig. 1 in that the amplitude of the oscillatory current flow through the grid bias resistor 30 controls the indicating device which, in this form of the invention, is an electron beam or "magic eye" tube 60. A part of the direct current potential developed across the bias resistor 30 is applied to the grid 63 of tube 60 through a radio frequency filter, comprising resistor 61 and condenser 62, which blocks the oscillatory voltage from the grid of tube 60. The circuit connections to the electron ray tube are otherwise conventional and include a bias resistor 64 between the cathode 65 and the low potential terminal of the plate current source 15. The target 66 is connected through a single wave rectifier 67 to the high potential terminal of the alternating current plate source 15, and the anode elements 68 are connected to the direct current side of the rectifier 67 through the resistor 69.

The angular spread of the beam varies with the voltage applied to the grid 63 of the electron ray tube, and the spread of the beam is therefore a measure of the quality of the condenser under test. The circuit is conditioned for a test by adjusting the "bucking circuit" to block oscillation when the test circuit is open, and the amplitude control resistor 27 is then adjusted to give a narrow beam on the target 66 of tube 60 when the test prods 46 are connected.

As pointed out, hereinabove, short circuited condensers may be readily checked by means of a simple ohmmeter. Inasmuch as a completely short circuited condenser, when tested according to this invention, will cause the pointer of the indicating instrument to deflect to top mark, the invention contemplates the testing of the condenser with a standard ohm-meter prior to the testing to determine the quality of a condenser as a separate unit or as an element in a radio circuit.

The described embodiments are illustrative of the invention and it is to be understood that other variations that may occur to those familiar with the design of oscillator and indicating systems fall within the spirit of my invention as set forth in the following claims.

I claim:

1. A testing device comprising a vacuum tube and an associated oscillator circuit, a bucking circuit to prevent the tube from oscillating, indicating means responsive to current flow in a circuit of the tube in which current flow varies with the oscillatory condition of said tube, and a normally open circuited impedance coupled to the oscillator circuit and adapted when short circuited to disturb the phase relation between currents flowing in said oscillator and bucking circuits, thereby to cause the tube to oscillate.

2. The invention as defined in claim 1, wherein the indicating means is a permanent magnet, movable coil type of instrument provided with a scale, the coil of said instrument being in the said tube circuit.

3. The invention as claimed in claim 1, wherein the indicating means comprises a relay in said tube circuit, and lamp circuits controlled by said relay for alternate energization in accordance with the magnitude of the oscillatory current developed by said tube.

4. The invention as claimed in claim 1, wherein the indicating means comprises an electron ray tube having a control grid and a target, and means for impressing on said control grid a voltage that varies with current flow in said tube circuit.

5. A device for testing condensers comprising a vacuum tube and an associated oscillator circuit, a bucking circuit to feed energy from the anode to the grid of the tube to prevent the tube from oscillating, a coupling coil inductively coupled to the oscillator circuit, means for establishing electrical contact between the ends of the coupling coil and the condenser under test, and means in a circuit of the tube for indicating the quality of the condenser.

6. The invention as defined in claim 5, wherein the means for indicating the quality of the condenser is a permanent magnet, movable coil type instrument provided with a pointer and a scale having distinctive markings indicating ranges of pointer displacement corresponding respectively to a non-oscillating and to an oscillating condition of the tube.

7. A device for testing condensers comprising a vacuum tube and an associated oscillator circuit, a second circuit arranged to feed energy from the anode to the grid of the tube to prevent the tube from oscillating, a coil inductively coupled to the oscillator circuit and adapted to disturb the phase relation of currents flowing in said circuits when said coil is substantially short circuited by a condenser under test, thereby to cause the tube to oscillate, and means responsive to the oscillatory condition of the tube for indicating the quality of the said condenser.

8. Apparatus for testing condensers comprising a vacuum tube, an oscillator circuit network connected to said tube and balanced normally to prevent oscillation thereof, indicating means responsive to the magnitude of oscillatory current flow developed by said tube, and a normally open test circuit for disturbing the balance of said oscillator circuit network to condition the tube for oscillation at a selected frequency upon a completion of the test circuit through a condenser having a low capacitive reactance at the selected frequency, said test circuit comprising a coil coupled to said oscillator circuit network, and leads for connecting across said coil a condenser that is to be tested.

9. Apparatus for testing condensers comprising a vacuum tube, an oscillator circuit connected to said tube to condition the same for oscillation, a blocking circuit connected to said tube to prevent oscillation thereof, indicating means responsive to the magnitude of oscillatory current flow developed by said tube, and means for counteracting the oscillation-blocking action of said blocking circuit; said means comprising a coil coupled to said oscillator circuit, a condenser connected to an end of said coil, and pin jacks connected to the terminals of said coil and condenser to receive leads for application to the terminals of a condenser to be tested.

10. In apparatus for testing electrical condensers, the combination with a multiple electrode vacuum tube, a current source for impressing alternating current potentials upon said electrodes to energize the tube, and a circuit network connected to said tube electrodes; said network including coupled reactances conditioning said tube for oscillation at a high radio frequency, means normally preventing oscillation thereof, and an inter-electrode circuit in which a direct current voltage is developed; of a test circuit coil coupled to said coupled reactances to counteract said oscillation-blocking action of said means, said coil having terminal means connected to the ends thereof for application to the condenser to be tested, and direct current indicating means responsive to current flow in said inter-electrode circuit.

11. Apparatus for testing the merit of a condenser, said apparatus comprising a vacuum tube including a cathode cooperating with grid and anode electrodes, coils connected between said cathode and the respective electrodes, said coils being coupled to each other to promote the generation of an oscillatory current by said tube, means normally blocking the generation of an oscillatory current, and a normally open test circuit including a coil coupled to said first coils and adapted to counteract said blocking means when short circuited by impedance of low capacitive reactance at the frequency of said oscillatory current; whereby a condenser may be tested in situ in a circuit by connecting said test cricuit across the same.

12. An instrument for testing a condenser for open and intermittent connection, in combination, a circuit including a thermionic tube, a grid coil, and a plate coil for generating oscillations, a test circuit including a pair of terminals adapted to be applied across the condenser under test, an inductance coil in the said test circuit, the three said coils being mutually inductively associated, and means for indicating oscillatory balance, the said tri-coils and said circuits being standardized to cause the said means to normally indicate balance, whereby when the said terminals are applied across the condenser a continuation of balance denotes an open connection and a flickering of the indicator between balance and unbalance denotes an intermittent connection.

13. An instrument for testing a condenser for open and intermittent connection, in combination, a circuit including a thermionic tube, a grid coil, and a plate coil for generating oscillations, a test circuit adapted to include the condenser under test, an inductance coil in the said test circuit, the three said coils being mutually inductively associated, the said oscillating circuit and the test circuit and the tri-mutual coils being standardized in a normal state of balance, and means for indicating the presence of oscillations (unbalance) or absence of oscillations (balance).

14. An instrument for testing a condenser for open and intermittent connection, in combination, a circuit including a thermionic tube, a grid coil, a grid leak and condenser, and a plate coil for generating oscillations, a test circuit adapted to include the condenser under test, an inductance coil in the said test circuit, the three said coils being mutually inductively associated, the said oscillating circuit and the test circuit and the tri-mutual coils being standardized in a normal state of balance, and means connected across the said grid leak for indicating oscillatory balance.

15. An instrument for testing a condenser for open and intermittent connection, in combination, a circuit including a thermionic tube, a grid coil, and a plate coil for generating oscillations, a test circuit including a pair of terminals adapted to be applied across the condenser under test, an inductance coil in the said test circuit, the three said coils being mutually inductively associated, the tri-mutual coils and the said circuits being standardized in a normal state of balance, when said test terminals are not touching each other, and means for indicating oscillatory balances.

16. An instrument for testing a condenser for open and intermittent connection, in combination, means including a thermionic tube, a grid coil, and a plate coil for generating oscillations, a test circuit adapted to include the condenser under test, an inductance coil in the said test circuit, the three said coils being mutually inductively associated, and means for indicating the presence of oscillations (unbalance) or absence of oscillations (balance).

17. An instrument for testing a condenser for open and intermittent connection, in combination, a circuit having a thermionic tube, a grid coil and a plate coil for generating oscillations, a test circuit including as an integral part thereof a pair of test leads adapted to include the condenser under test, an inductance coil in the said test circuit, the three said coils being mutually inductively associated, the said oscillating circuit and the test circuit and the tri-mutual coils being standardized in a normal state of balance, and means for indicating the presence of oscillations (unbalance) or absence of oscillations (balance), the said test leads having a definite value of distributed capacitance and inductance.

OLIVER JAMES MORELOCK.